Figure 1:
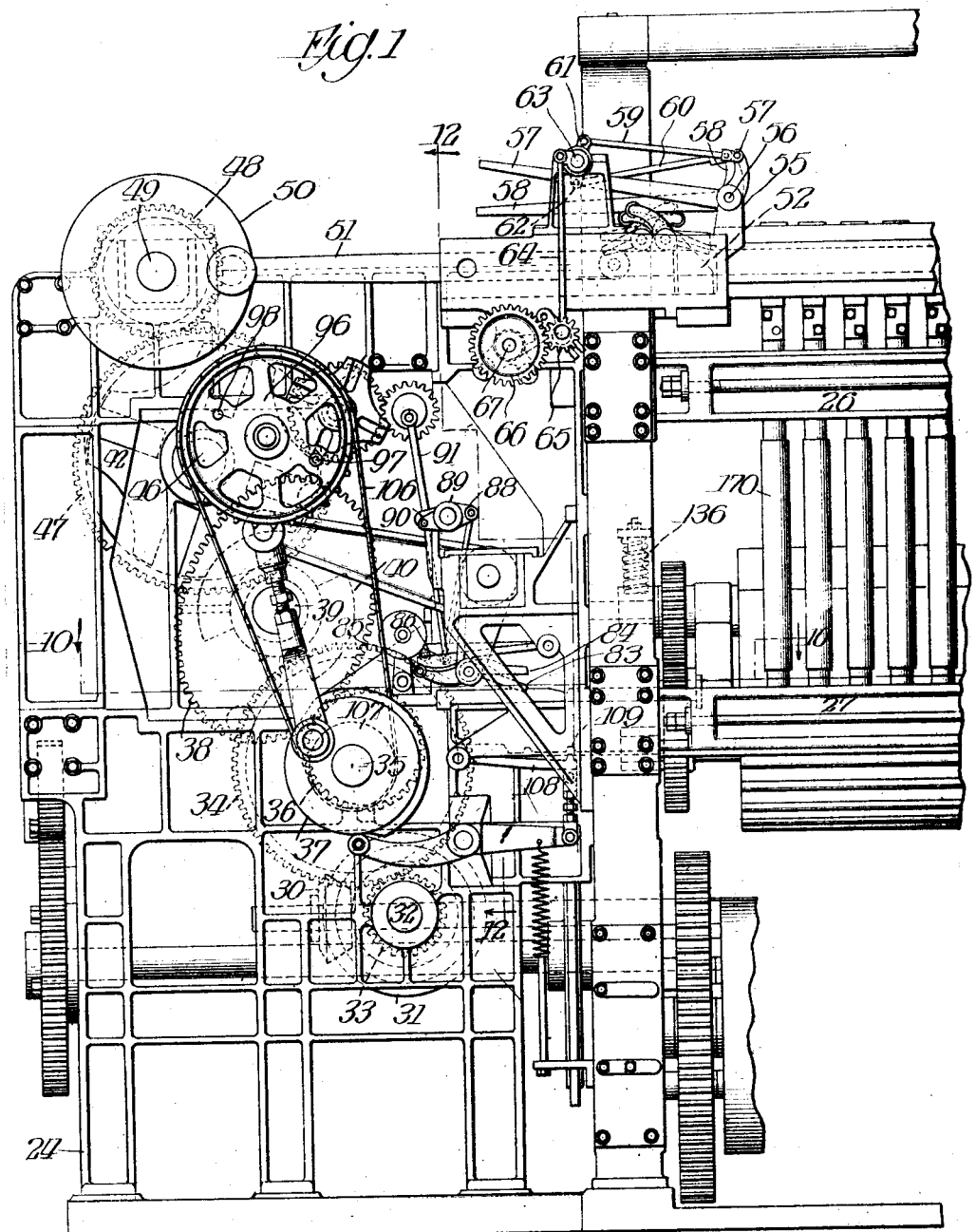

W. A. KILMER.
WIRE FABRIC MACHINE.
APPLICATION FILED OCT. 6, 1913.

1,111,593.

Patented Sept. 22, 1914.
13 SHEETS—SHEET 1.

Witnesses:
Inventor:

W. A. KILMER.
WIRE FABRIC MACHINE.
APPLICATION FILED OCT. 6, 1913.

1,111,593.

Patented Sept. 22, 1914.
13 SHEETS—SHEET 2.

W. A. KILMER.
WIRE FABRIC MACHINE.
APPLICATION FILED OCT. 6, 1913.

1,111,593.

Patented Sept. 22, 1914.
13 SHEETS—SHEET 7.

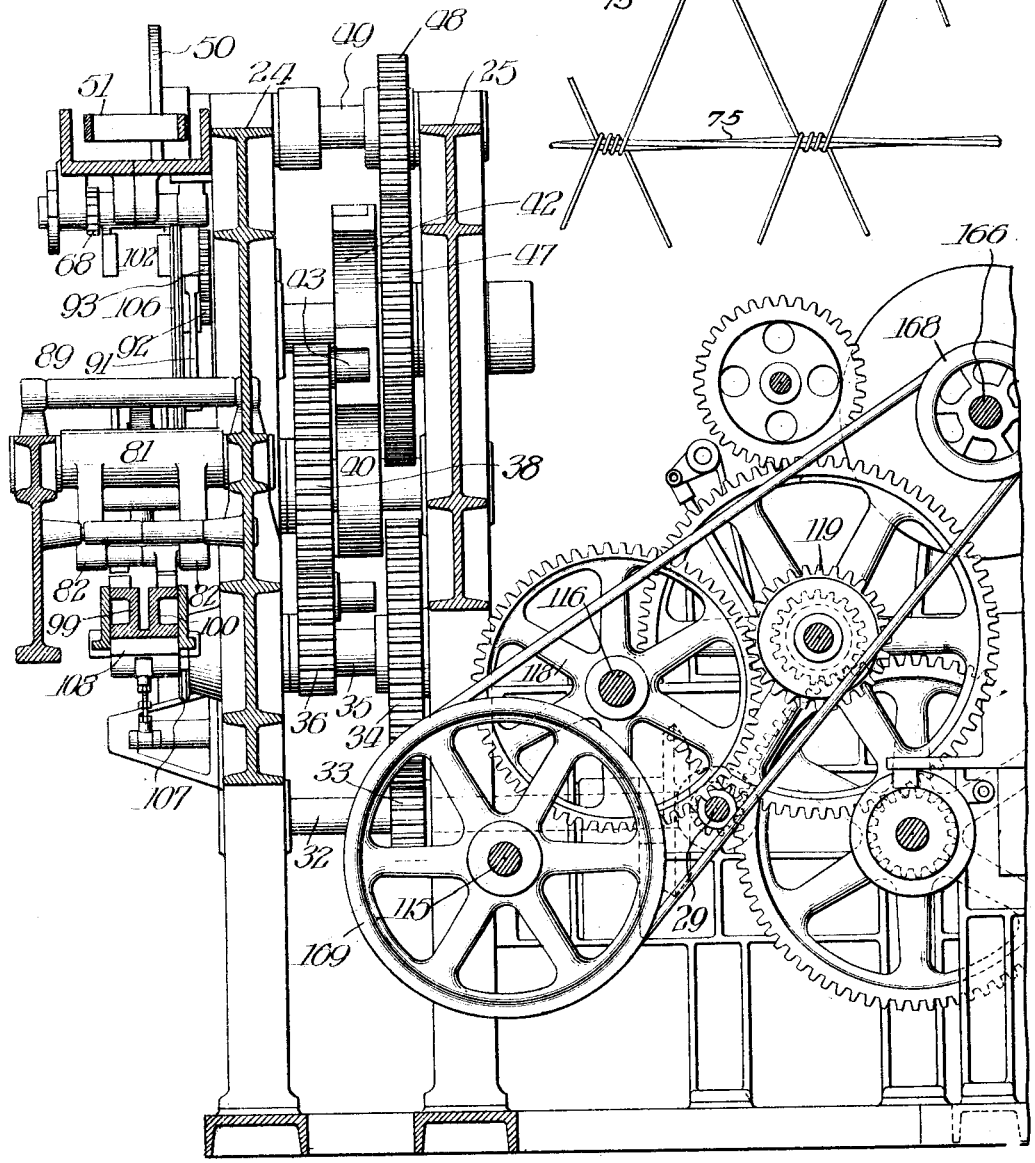

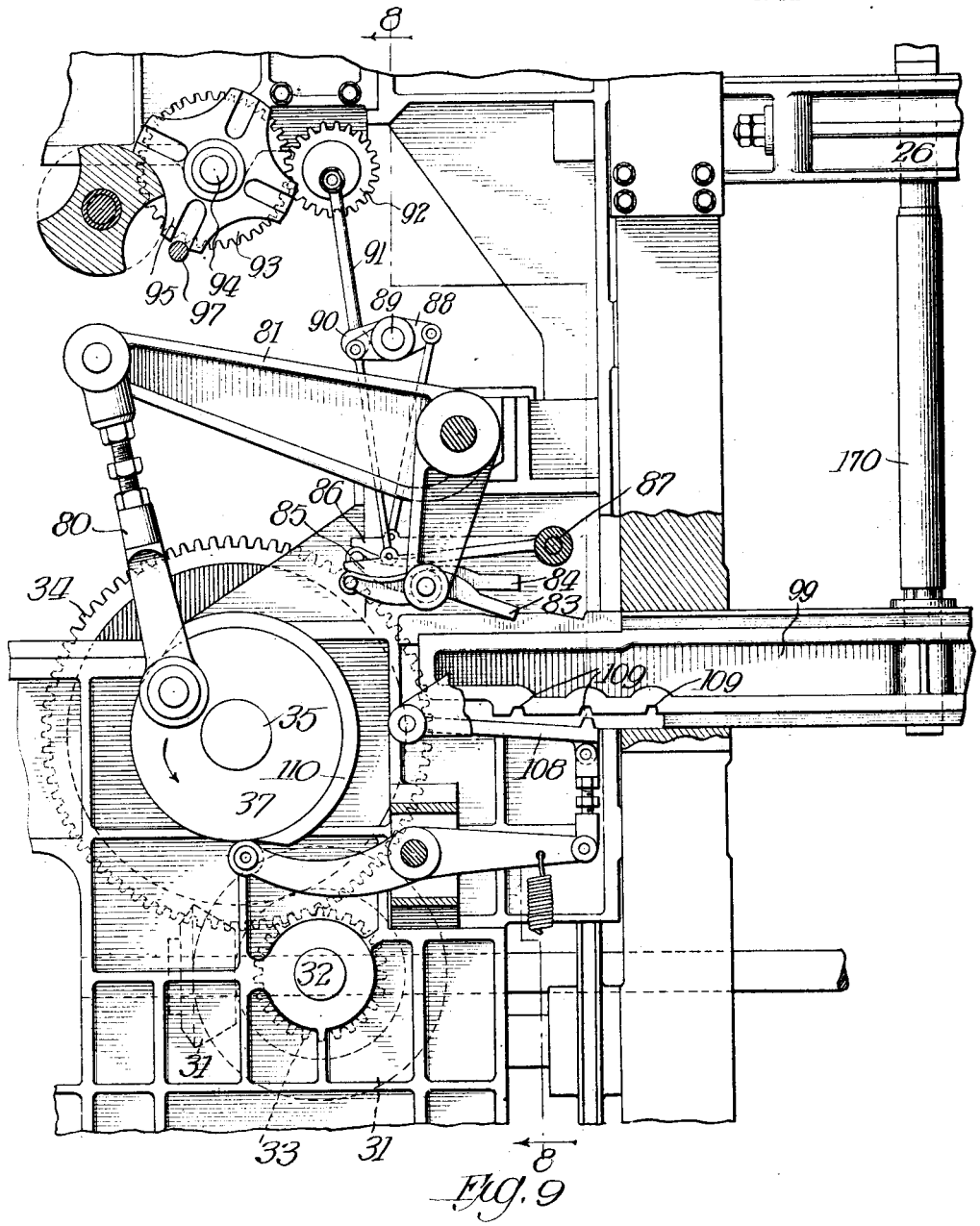

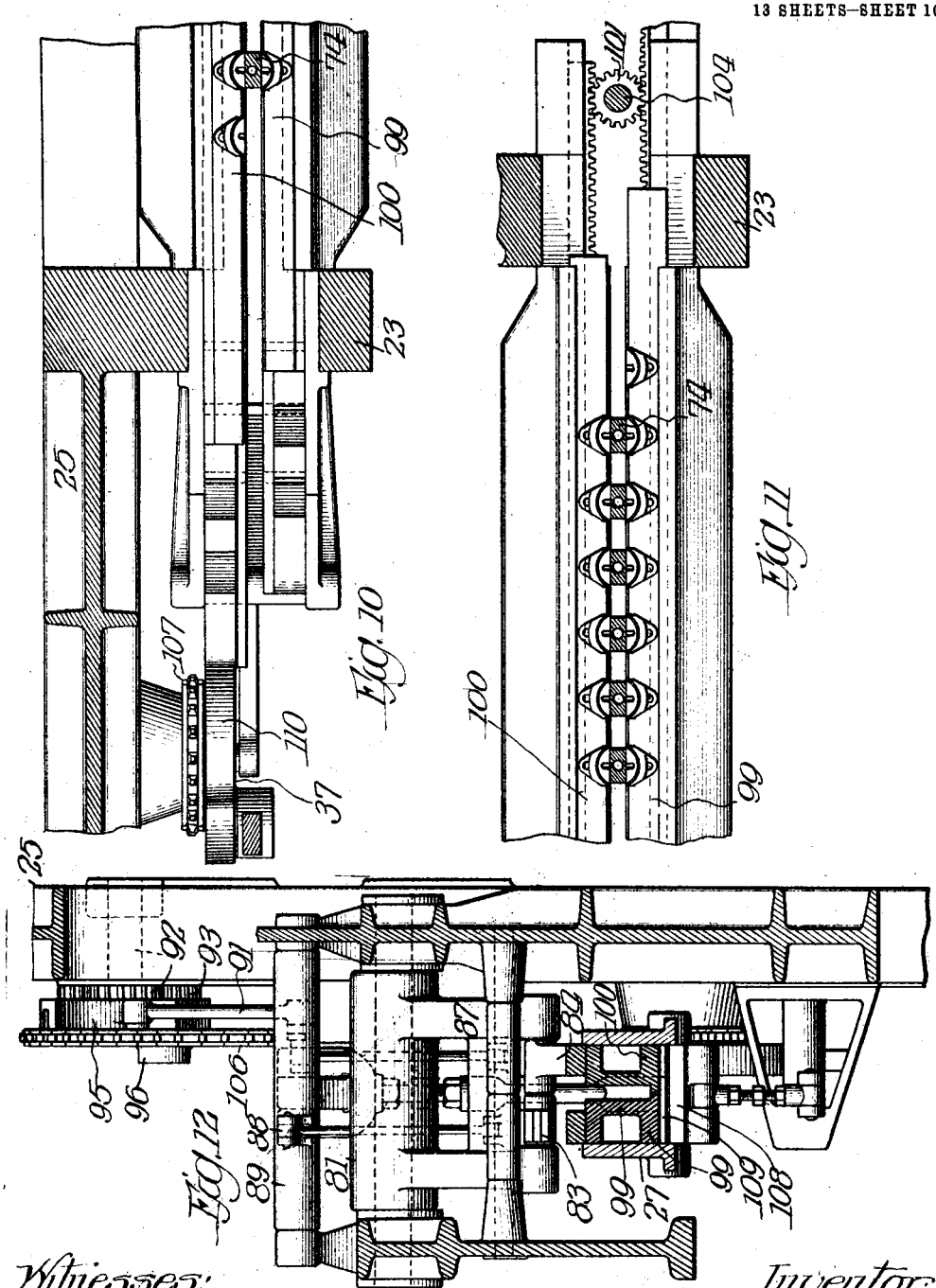

W. A. KILMER.
WIRE FABRIC MACHINE.
APPLICATION FILED OCT. 6, 1913.
1,111,593.
Patented Sept. 22, 1914.
13 SHEETS—SHEET 11.
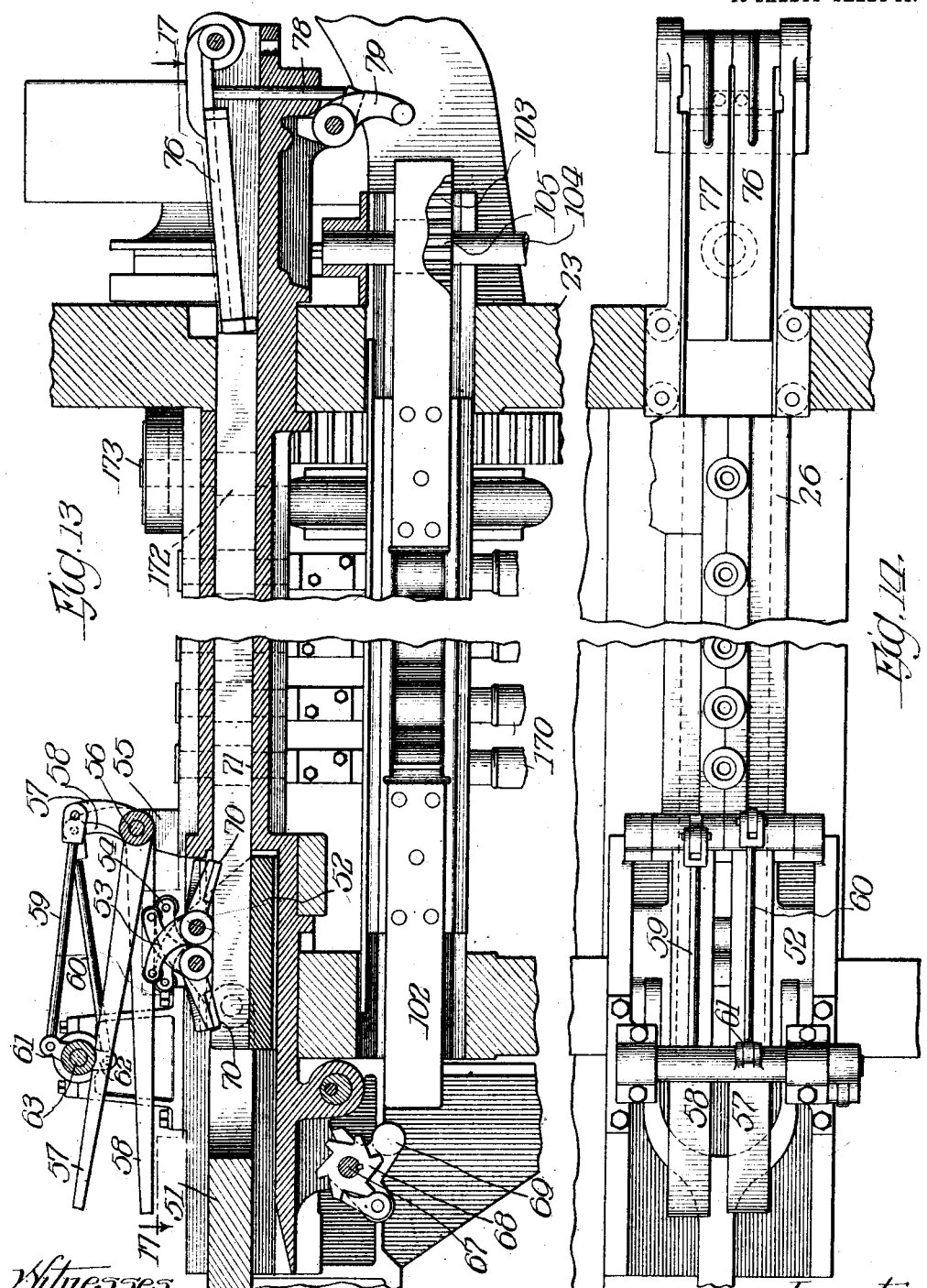

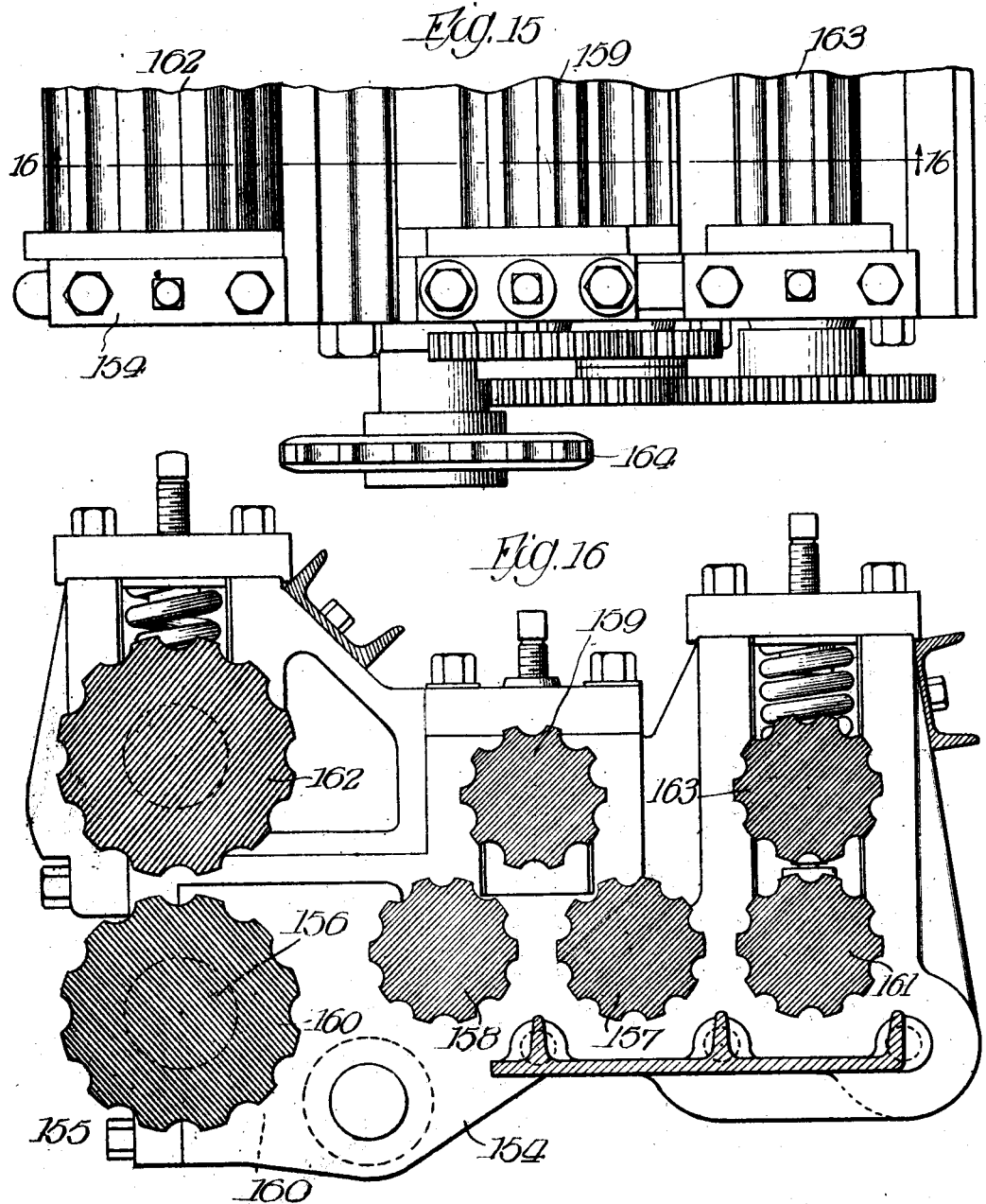

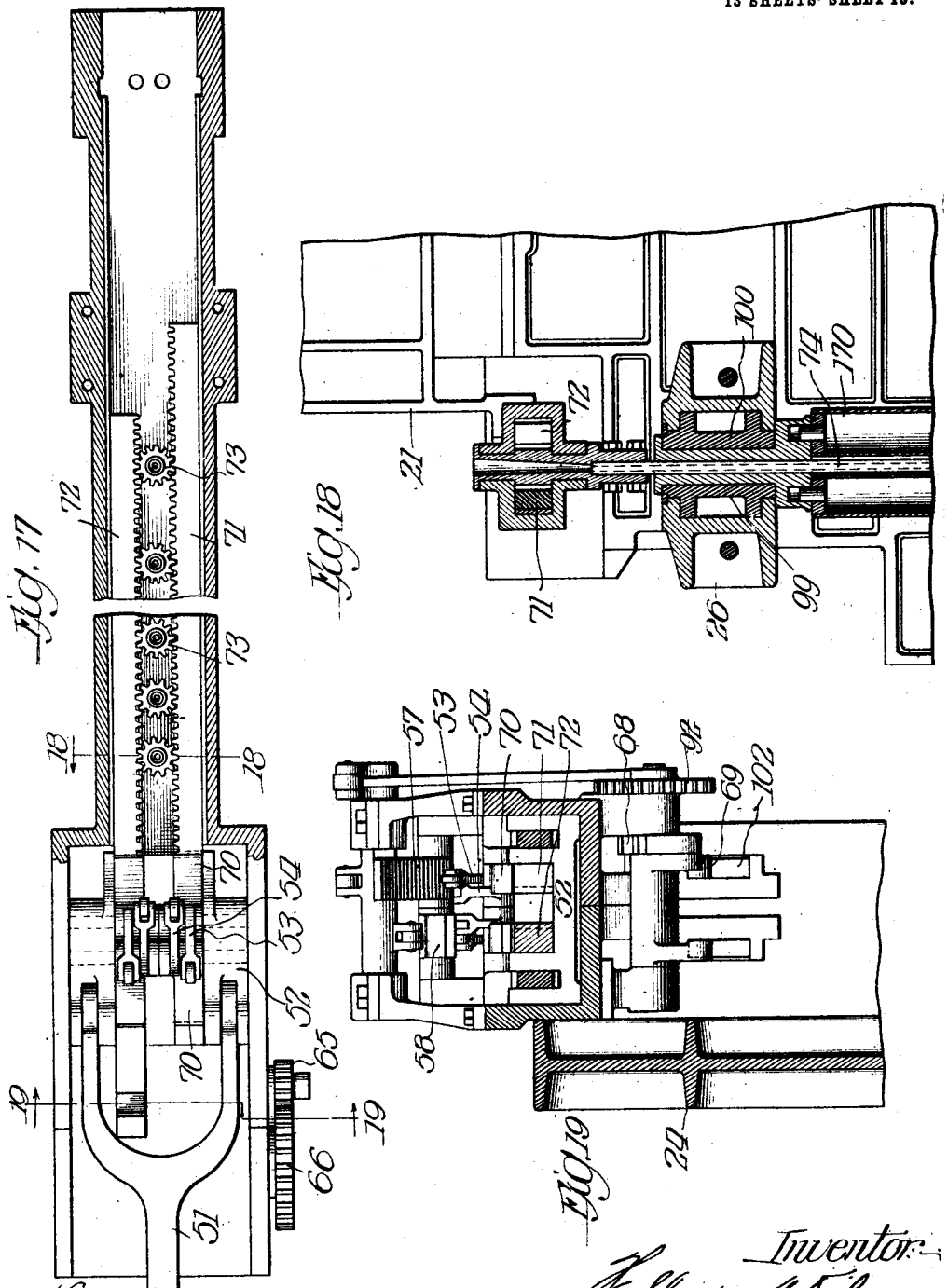

UNITED STATES PATENT OFFICE.

WILLIAM A. KILMER, OF DE KALB, ILLINOIS, ASSIGNOR TO THE AMERICAN STEEL & WIRE COMPANY OF NEW JERSEY, OF HOBOKEN, NEW JERSEY, A CORPORATION OF NEW JERSEY.

WIRE-FABRIC MACHINE.

1,111,593. Specification of Letters Patent. Patented Sept. 22, 1914.

Application filed October 6, 1913. Serial No. 793,580.

*To all whom it may concern:*

Be it known that I, WILLIAM A. KILMER, a citizen of the United States, and resident of De Kalb, in the county of Dekalb and State of Illinois, have invented certain new and useful Improvements in Wire-Fabric Machines, of which the following is a specification.

My invention relates to wire fabric machines and has particular reference to a novel machine of this character, which shall be adapted to produce heavy wire fabric suitable for concrete reinforcement. The apparatus shown in this application is a modification of that shown in my Patent No. 1,076,831, granted Oct. 28, 1813. A wire fabric machine such as shown in my patent referred to, has been found very efficient in service. However, its productive speed has been limited, due to the fact that the bobbins which carry the transverse wire have been found incapable of rotation at a high speed, due to the development of centrifugal force tending to disrupt or distort the bobbins. Thus it was found that the speed of production of the entire machine was limited to the speed at which the bobbins might be revolved. In order therefore to increase the productive speed of the machine, I have conceived the idea of providing for a greater number of actuations within a specified time, meanwhile maintaining a safe speed of rotation for the bobbins. It was likewise found that by increasing the actual speed of operation without increasing the number of actuations, the reciprocating bars for actuating the twister spindles developed trouble. This was occasioned by the fact that such reciprocating bars being necessarily of considerable mass, produced shocks in starting and stopping and these shocks rapidly caused the deterioration of the coöperating parts. By increasing the number of actuations and maintaining a proper speed of operation. this difficulty was to a considerable extent overcome. In addition, I have added cushions whereby the shocks may be minimized.

Another particular advantage in the present machine is in the construction of the means for actuating the reciprocating rack-bars, and in the mechanism by means of which the style of fabric to be woven may be changed. This is accomplished by changing the throw of the bobbin-shifting rack-bars. In the present mechanism either the two or three-step movement is possible with very slight changes.

One of the principal advantages gained in the present construction is in the provision of mechanism whereby the rack-bars controlling the rotation of the bobbins are moved at a practically constant speed; that is, the rack-bars do not have a high speed and a low speed point in their travel. Thus the maximum speed is secured at all points in their travel.

Inasmuch as it is desirable particularly in the manufacture of short lengths of fabric for use in concrete reinforcements, that the product should be delivered flat, I have provided straightening mechanism associated with the machine, this mechanism including fluted rolls, the use of which is found to be advantageous.

Other and further objects will appear hereinafter and be more particularly pointed out in the claims.

Figure 2:
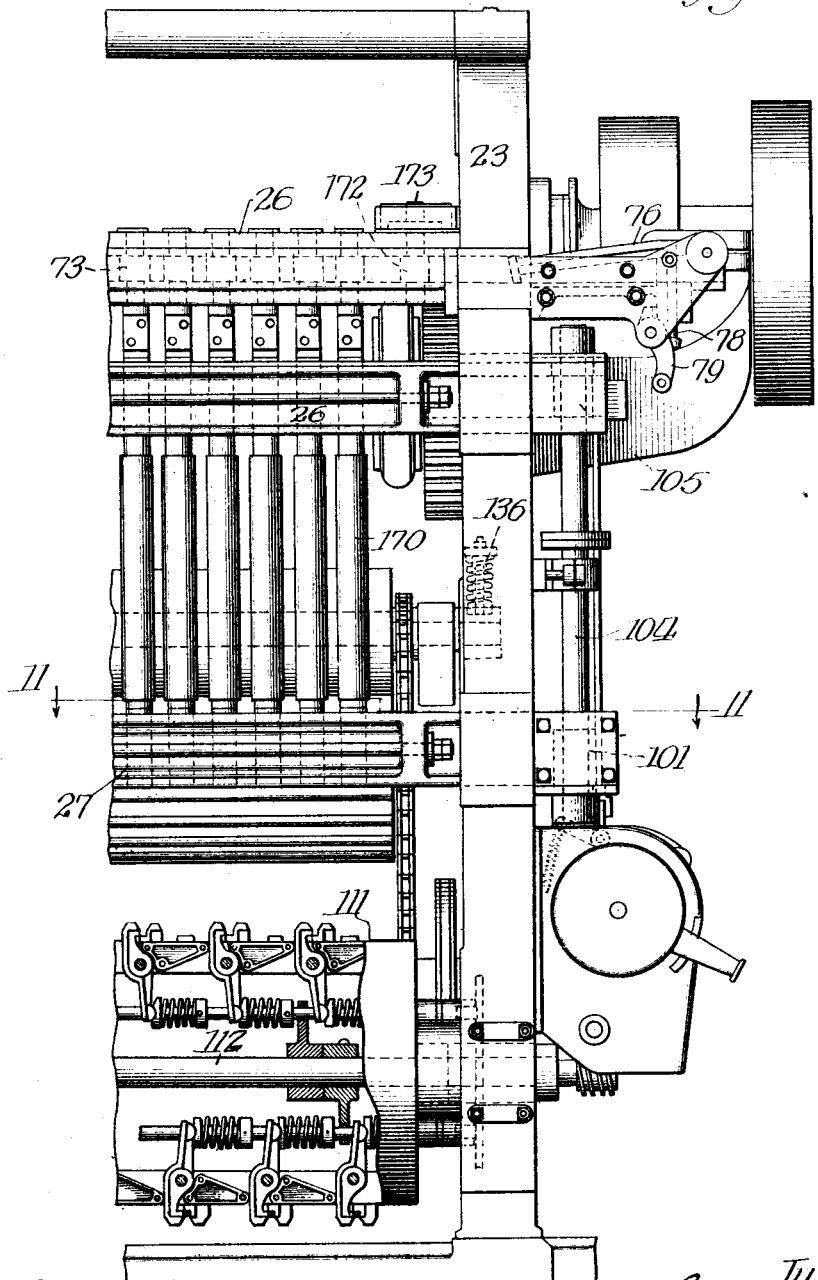
Figure 3:
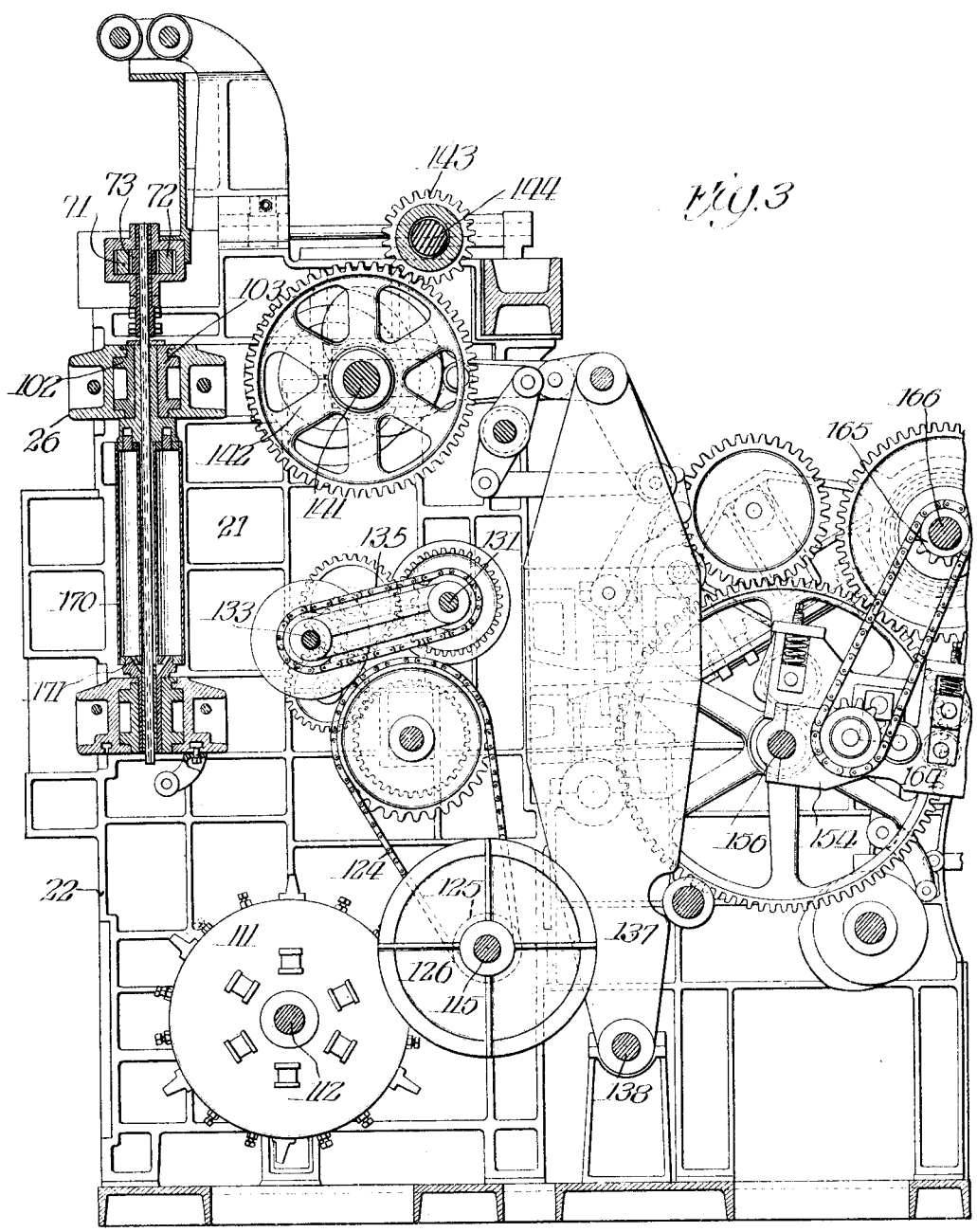
Figure 4:
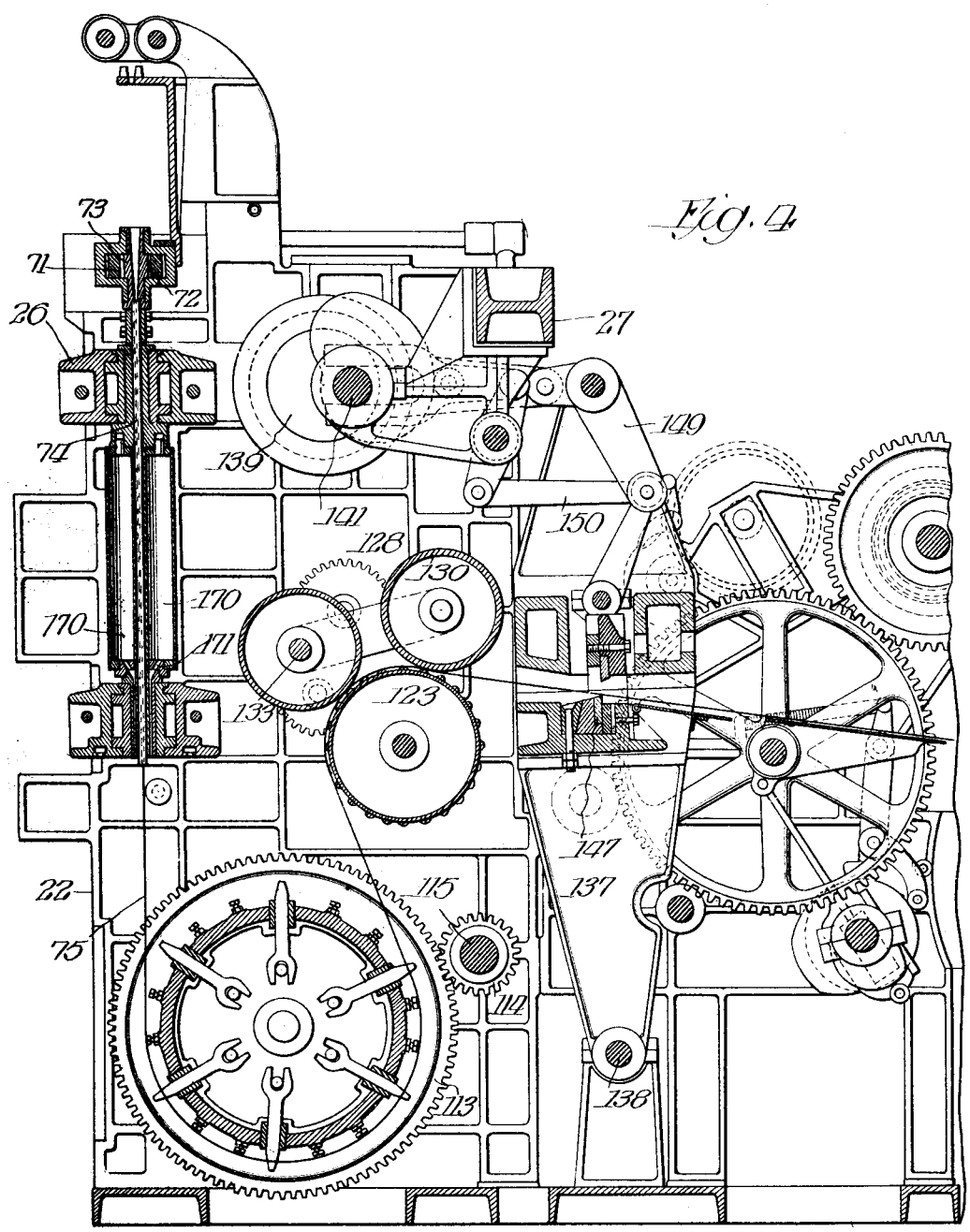
Figure 5:
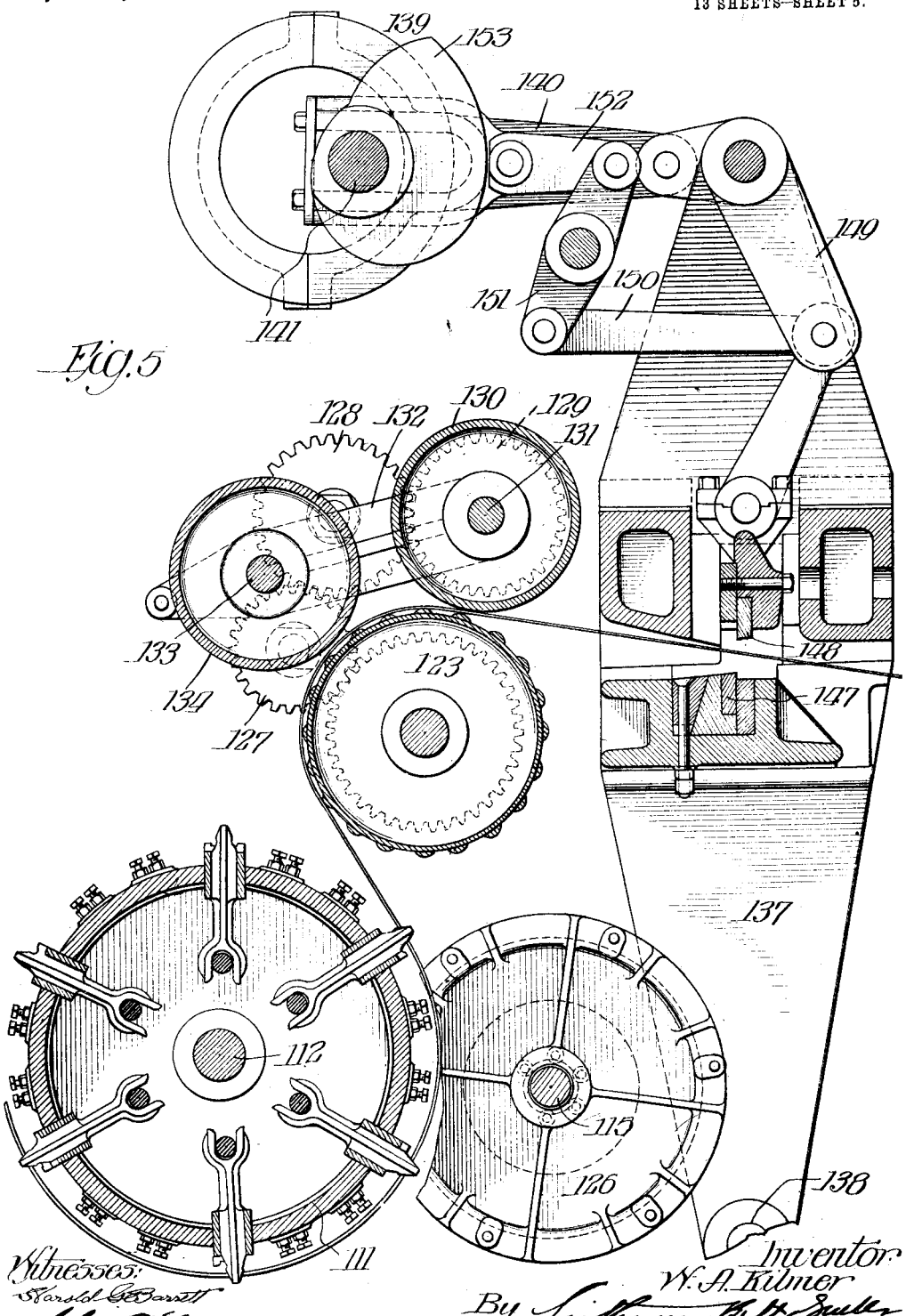
Figure 6:
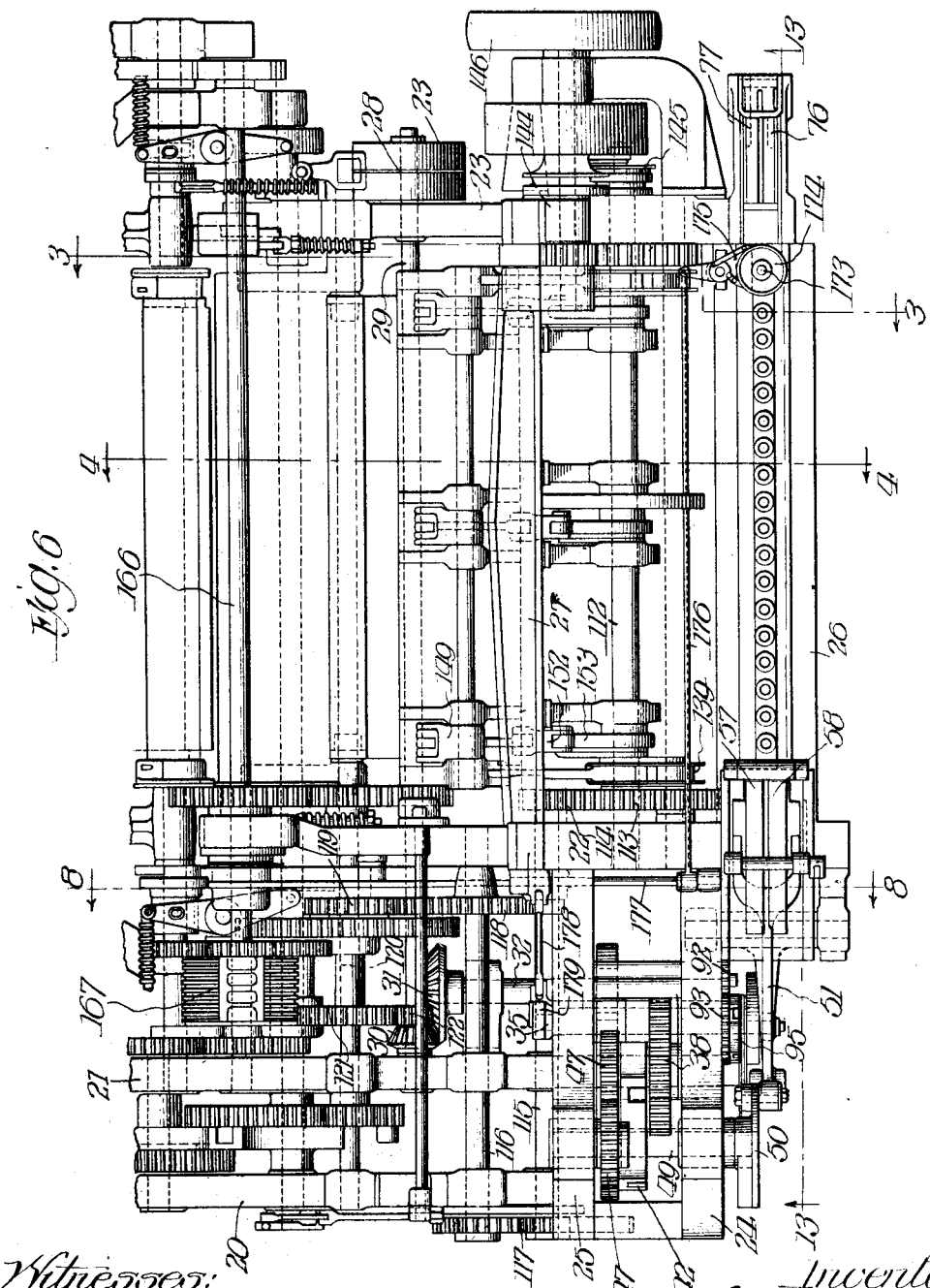
Figure 7:
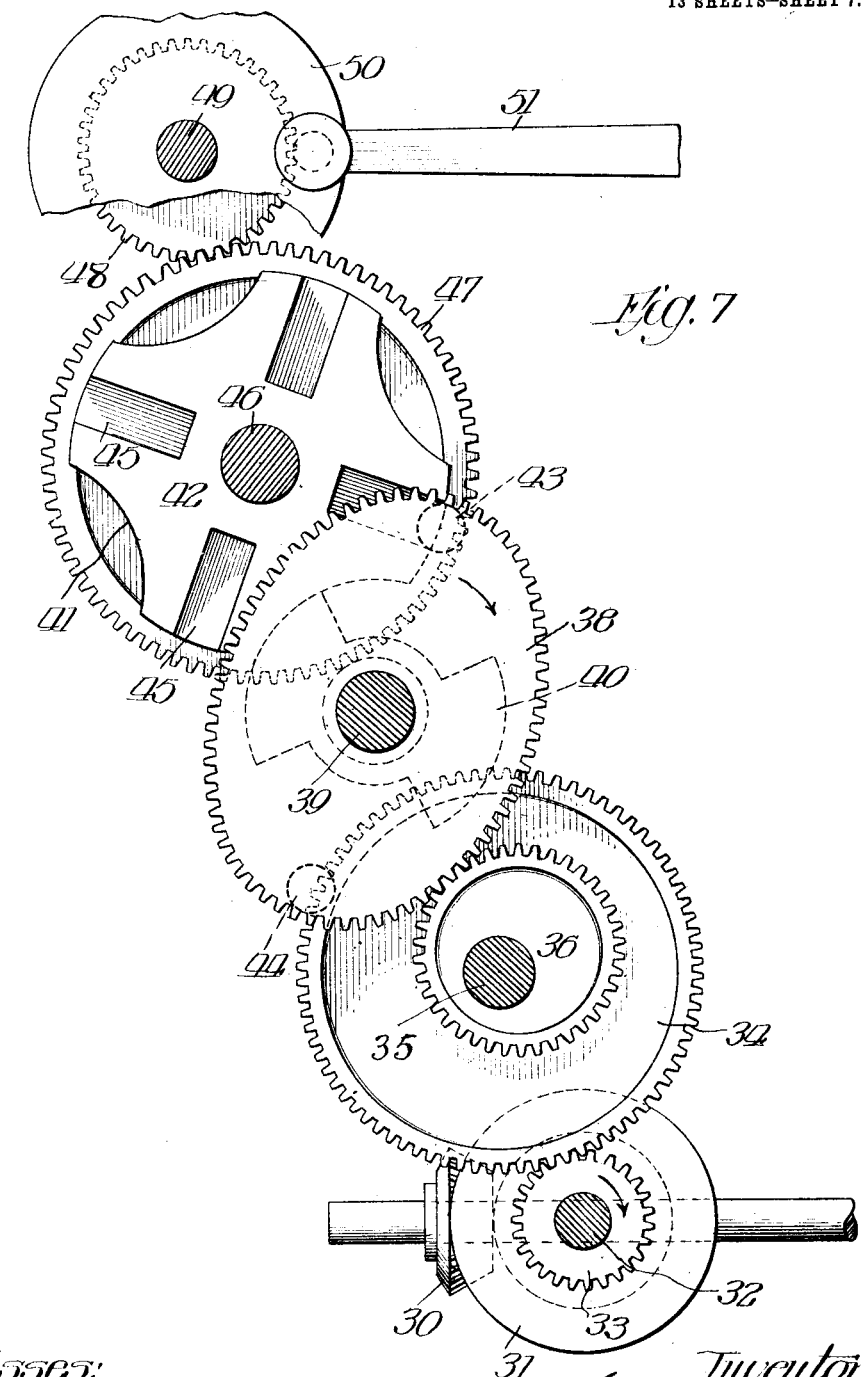

My invention will be more readily understood by reference to the accompanying drawings, wherein, Figure 1 is a front elevation of a machine constructed in accordance with my invention, the right-hand half of the machine being broken away; Fig. 2 is a similar view showing a portion of the machine which was broken off from Fig. 1; Fig. 3 is a longitudinal vertical section through the machine, the section being taken on the line 3—3 of Fig. 6; Fig. 4 is a similar sectional view taken on the line 4—4 of Fig. 6; Fig. 5 is an enlarged sectional detail showing the pull-out drum, feed rolls and flying shear; Fig. 6 is a plan view of the machine; Fig. 7 is an enlarged elevation of the train of gears by means of which the rack-bars are reciprocated; Fig. 8 is an elevation partly in section, the section being taken on the line 8—8 of Figs. 6 and 9; Fig. 9 is a side elevation somewhat enlarged, showing the slide-bar operating means in detail; Fig. 10 is a plan view of the slide-bar operating means, the view being taken on the line 10—10 of Fig. 1; Fig. 11 is a similar view on the line 11—11 of Fig. 2; Fig. 12 is a transverse vertical section of the lower slide-bar operating mechanism, taken on the line 12—12 of Fig. 1; Fig. 13 is an elevation, partly in section, showing the upper rack-bar mechanism, the view being taken on the line 13—13 of Fig. 6;

Fig. 14 is a plan view of the construction shown in Fig. 13; Fig. 15 is a plan view of my novel straightening rolls; Fig. 16 is a section on the line 16—16 of Fig. 15; Fig. 17 is a plan view, partly in section, showing the arrangement of the top rack-bars and their operating mechanism; Fig. 18 is a section on the line 18—18 of Fig. 17, somewhat enlarged; and Fig. 19 is an end elevation, partly in section, on the line 19—19 of Fig. 17; Fig. 20 is a representation of the fabric woven by this machine.

Referring more particularly to the drawings, it will be seen that my novel machine is built in a frame consisting of longitudinal frame members 20, 21, 22, 23 and transverse frame members 24, 25, 26, 27. Mounted within the longitudinal frame members and provided with tight and loose pulleys 28, is the main power shaft 29. Connected to the shaft 29 is a beveled pinion 30, meshing with a beveled gear 31, fast on a counter-shaft 32, best shown in Figs. 6 and 8. Keyed to shaft 32 is a spur-pinion 33, meshing with a large spur gear 34, mounted on a shaft 35, which shaft carries an eccentric gear 36, best shown in Fig. 7, through which power is applied for reciprocating the rack-bars. Also keyed to the shaft 35 is a crank disk 37, through which motion is transmitted to the slide-bar, later to be described.

Meshing with the eccentric gear 36 is an elliptical gear 38, mounted on a shaft 39. Also mounted on the shaft 39 is a segmental locking disk 40, the segments of which coöperate with arcuate cut-outs 41 in a star gear 42. Mounted on a line with the major axis of the elliptical gear are two pins 43, 44, these pins coöperating with the radial grooves 45 in the star gear 42, thus forming the well-known Geneva movement. The pins 43, 44 are suitably provided with anti-friction rolls. The star gear 42 is keyed to shaft 46, which shaft carries a spur-gear 47, meshing with a pinion 48, which pinion is mounted on a shaft 49 and carries on its overhung end a crank disk 50. Connected to the disk 50 is a pitman 51, having a cross-head 52 secured to the free end thereof, this cross-head having mounted thereon a plurality of pawls, as best shown in Figs. 1 and 13. Preferably there are two sets 53, 54 of said pawls, there being two opposed pawls in each set. The upper ends of the pawls are provided with anti-friction rolls, the actuation of the pawls being secured in the following manner: Mounted on a bracket 55 is a shaft 56, which carries two rocker arms 57, 58, each thereof having longitudinally extending legs coöperating with the anti-friction rolls on the upper ends of the pawls 53, 54. Connected to the other arms of the rockers are links 59, 60, which links are in turn connected to short cranks 61, 62, rigid with a shaft 63, which shaft is adapted to be rocked by means of a link 64, connected at its lower end to a geared crank 65, meshing with gear 66, mounted on a shaft 67, which shaft, as best shown in Fig. 13, carries a ratchet 68. Motion is imparted to the shaft by means of a pawl 69, which pawl is moved by a slide-bar in its reciprocation. The proportions of the parts are such that at each actuation of the pawl by the slide-bar the rocker arms 57, 58 are alternately raised and lowered, thus alternately raising and lowering one of the sets 53, 54 of the pawls. These pawls are adapted to engage notches 70 in rack-bars 71, 72. These rack-bars mesh with gears 73, best shown in Figs. 3 and 4, which gears are bolted to spindle bars 74, which spindle bars cause the rotation of the spindles in a manner well known. The gear 73 and spindle bar 74 are apertured to permit the passage therethrough of the longitudinal or strand wire 75 of the fabric.

The operation of the parts whereby the reciprocation of the rack-bars is secured will be readily understood from the preceding description. It will, however, be noted particularly on reference to Fig. 7, that the motion transmitted to the pitman 51 is practically uniform throughout its stroke for the reason that the coöperation of the eccentric gear 36 with the elliptic gear 38, causes an alternate fast and slow motion which motion is transmitted to the star-gear to secure a substantially uniform rotation thereof. It will be understood that as one of the pins 43, 44 enters the radial groove 45, the rotative motion transmitted to the star gear is decreasing but as the pin travels inwardly of the groove and near the axis of the star gear, that the star gear will tend to rotate faster. Furthermore, by placing two pins on the elliptic gear, twice as many actuations of the star gear are secured as when one pin is employed, and that therefore a moderate speed of operation may be developed with increased productive capacity. It will furthermore be noted that the power transmitted to the pitman is all transmitted by means of gears and without torsional strain on the shaft. This is particularly true as to the connection between the elliptic gear and the star gear.

In order to secure the three-step movement the pawls, as shown in Fig. 13, are actuated as follows: Assuming the rack-bars to be in neutral position; that is, each rack-bar 71, 72 being in the same horizontal position, a movement of the cross-head to the left as shown in Fig. 13, will cause travel of rack-bar 71 to the left and a corresponding travel of rack-bar 72 to the right. Without disturbing the pawls, continued motion of the cross-head to the right, as viewed in Fig. 13, will return the rack-bars to the position of Fig. 13. At this point a slide-bar will coöperate with pawl 69 and cause actuation of rocker arms 57, 58, thereby raising the set of pawls 53, and lowering pawls 54 into engagement with rack-bar 72. The cross-head then traveling to the left as viewed in Fig. 13, will cause the travel of rack-bar 71 to the right to the extent of its movement, the return of the cross-head causing the return of both rack-bars to neutral position. Thus a three-step movement is secured. However, if only a two-step movement is desired, the rocker arms 57, 58 are disconnected and one set of pawls secured out of engagement with the rack-bar. The movement of the rack-bars will then be back and forth, a distance equal to the throw of the cross-head 52.

As a stop for the rack-bars in neutral position, I provide a pair of dogs 76, 77, best shown in Figs. 13 and 14, the ends of which are adapted to lie in the path of travel of the rack-bars, the raising of the dogs being accomplished by means of pins 78, actuated by bell-crank 79, having a portion projecting into the path of a slide-bar. On an extreme movement to the right, as shown in Fig. 13, the bell-crank 79 will be actuated and the dog 76 lifted to permit rack-bar 71 to travel to the right.

As heretofore stated, the shaft 35 carries on its outer end a disk 37. Connected to this disk is a link 80, which link is connected to the bell-crank 81, having a yoke 82 at one end thereof. Pivotally connected to the legs of the yoke 82, are pawls 83, 84, each thereof having anti-friction rolls on one end thereof. Coöperating with such anti-friction rolls are levers 85, 86, mounted on a shaft 87, these levers having a link connection to opposite sides of a rocker 88, mounted on a shaft 89, which shaft is adapted to be rocked by means of a lever and link 90, 91, by a crank gear 92, best shown in Fig. 9. Meshing with such crank gear is a gear 93, mounted on a shaft 94, which shaft carries a star gear 95. This star gear is rotated by means of a large sprocket 96, best shown in Fig. 1, in which are provided two holes for the accommodation of pins 97, 98. If it is desired to utilize a three-step movement, but one pin 97 is placed in the sprocket wheel. The pawls 83, 84, will therefore be undisturbed during two complete revolutions of the disk 37. In the position of the parts shown in Fig. 9, the slide-bars are in neutral position. A travel of 180° of the disk 37, will cause a travel to the right of slide-bar 99, to its limit of movement. On the return of disk 37 to the position of Fig. 9, the pawls 83, 84, will be actuated, the former raised and the latter lowered, the pawl 84. engaging the first notch to the right in slide-bar 100. On the following half turn of disk 37, slide-bar 100 will be pushed forward, bar 99 retracted, bringing the bars again in neutral position. On the next forward movement, pawl 84 will engage with the second notch from the right on bar 100, thus forcing bar 99 to its extreme rearward point and bar 100 to its extreme forward point. However, in case only a two-step movement is desired, the second pin 98 is placed in the sprocket 96, whereupon the pawls 83, 84, are reversed at each complete rotation of the disk 37. It will be understood that rack-bars 99, 100, are adapted for simultaneous movement in reverse direction by means of spindle gear 101, shown in Fig. 11, and that an upper series of slide-bars 102, 103, move in unison therewith by reason of a shaft 104, connecting the gear 101 with a similar gear 105, mounted between the upper slide-bars. It will be understood further that the slide-bars cause the shifting of the bobbins and produce the mesh of the fabric. It is the slide-bars 102, 103, which cause the actuation of the pawl 69, and the bell-crank 79, previously referred to. The sprocket 95 is actuated by a chain 106, meshing with a smaller sprocket 107, fast on shaft 35, best shown in Figs. 1 and 8. Inasmuch as it is necessary to provide an exact movement of the slide-bars, I provide locking means to hold the same in proper position after movement. This locking mechanism is best shown in Fig. 9 and consists of a lever 108, having an upwardly projecting lug thereon, which lug coöperates with one of three notches 109. This lever 108, is actuated through a link and lever connection, by a cam 110, provided on the periphery of disk 37.

As shown, I provide a pull-out drum, the construction of which is identical with that shown in my patent heretofore referred to and which will not therefore be specifically described. This pull-out drum 111, is mounted on a shaft 112, which shaft carries a large gear 113, meshing with a pinion 114, mounted on a shaft 115, extending to the side of the machine. Conveniently mounted on shafts 115 and 116 are change gears 117, by means of which the speed of rotation of the pull-out drum may be governed. Shaft 116, carries a large gear 118 (best shown in Fig. 8), which gear meshes with a pinion 119, which pinion is mounted on a sleeve 120, which sleeve also carries a gear 121, meshing with a pinion 122, fast to the power shaft 29.

In order to provide a positive feed at a point beyond the pull-out drum and to keep the fabric taut, I provide pull-out rolls, as best shown in Figs. 3, 4 and 5. A fluted roll 123, is driven by means of a chain 124, from a small sprocket wheel 125, connected to one portion of a friction clutch 126, fast on shaft 115. Roll 123, is provided with a gear meshing with the idler 127, which idler meshes with a second idler 128, meshing with the gear 129, on a roll 130, carried on a shaft 131, mounted in a frame 132, which frame also carries the shaft 133, on which is mounted a roll 134, the rotation of which is secured by a chain 135, best shown in Fig. 3. Shaft 131 finds a bearing in the frame of the machine, the frame and the roll 134, being floating and having a gravity actuated pressure on roll 123. The shaft 131. is not rigidly connected to the frame but is adapted for limited vertical movement against the pressure of a spring 136, as best shown in Figs. 1 and 2.

As fabric passes from the pull-out rolls, it extends between the knives of a shear, as best shown in Fig. 5. This shear consists of a rigid frame 137, pivoted at its lower end at 138, and adapted to be swung on such pivot by means of an eccentric 139, connected by a link 140, to the upper end of the frame 137. This eccentric is caused to rotate by reason of connection to a shaft 141. carrying gear 142, meshing with a pinion 143, on a shaft 144, connected to a source of power by an intermittently acting clutch mechanism 145. Power is supplied through a constantly rotated pulley 146.

Mounted in the gear frame 137 is a stationary shear knife 147, and an upper reciprocating shear knife 148. The upper knife is caused to reciprocate by a toggle 149. connected by a link 150, to a rocker 151, the rocker being connected by a link 152, to a cam 153, mounted on shaft 141. It will be noted that as the eccentric rotates, the shear frame is swung to the right, the cam also rotating but causing no movement of the link 152, etc. However, as the shear frame advances the toggle will be actuated to cause the descent of the upper knife 148, and the severing of the fabric. At that point the cam 153 will have rotated sufficiently to permit the retraction of the link 152. and consequently the toggle is actuated to lift the knife. Thus the fabric may be sheared during its forward travel and without interruption of such travel. The means for actuating the clutch 145, heretofore referred to, may be varied, and such means will not be herein specifically described.

As a means for straightening the fabric after it leaves the shear, I provide novel straightening mechanism as best shown in Figs. 3, 15 and 16. This straightening mechanism consists of a frame 154, having a bearing 155, on a shaft 156, extending transversely of the machine. This frame is so constructed as to be adapted to swing on said shaft between frame members 22, 23. Thus the straightening mechanism as a whole may be swung up out of the line of the fabric when not required. It will be understood that when weaving lengths of fabric to be rolled the straightening mechanism is not used. However, when short lengths are required to be delivered flat, this mechanism is employed. Mounted between the frame 154 are the straightening rolls, which consist of rigid rolls 157, 158, and an upper resiliently mounted roll 159. At each side of the straightening rolls are lower rigid feed rolls 160, 161, and upper resiliently mounted rolls 162, 163. All the rolls 157 to 163 inclusive, are positively connected for rotation in unison, the main connection being through a sprocket 164, mounted on the shaft with roll 158. A chain connects this sprocket with a sprocket 165, mounted on a shaft 166, best shown in Figs. 3, 6 and 8. This shaft is frictionally rotated by a rope clutch 167, power being applied to the rope clutch by means of a suitable driven pulley 168 and a drive member 169 mounted on shaft 115, heretofore referred to.

The operation of the parts has been described in detail in connection with the description of the mechanism. Generally stated, however, the longitudinal or strand wires are fed in through the apertured gears 73 and spindle 74. At the lower end of the bobbins 170, the weaving takes place. It will be understood that the wire for forming the transverse members of the fabric is carried by the bobbins and is fed from the bobbins through openings 171 therein. After the weaving of the fabric it passes over the pull-out drum 111; thence between pull-out rolls 123, 134, 130, thence between the knives of the shear 137. At proper times the shear is automatically actuated to sever desired lengths of the fabric. In case the straightening mechanism is used, the straightening fabric passes between the straightening rolls, as shown in Figs. 15 and 16, from which point it is delivered in a flat condition. However, if the fabric is to be reeled, the straightening mechanism is swung up and the fabric passes directly to the reel mechanism, not herein specifically shown or described.

My present apparatus is exceedingly efficient in operation, may be more cheaply constructed than the machines shown in my patent heretofore referred to, occupies less floor space, and is generally adapted to the production of heavy wire fabric. An important point in the maintenance of moderate bobbin speed is that larger bobbins may be used thereby permitting of operation with less attention on the part of an attendant. Many advantages accrue from this feature.

As a means for braking the rack bars 71, 72, I provide a spindle gear 172 therebetween, this gear being provided with a stub-shaft 173, as best shown in Figs. 6 and 13 on which a brake drum 174 is mounted. A brake band 175 applies pressure as required through the medium of connecting rod 176, shaft 177, and rod 178, the latter being actuated by a cam 179 mounted on shaft 35. This cam is suitably timed whereby braking pressure is applied just before the rack-bars stop, thus tending to reduce the shock of stopping.

It is obvious that certain modifications may be made in the construction herein shown, and such modifications as are within the scope of my claims I consider within the spirit of my invention.

I claim:

1. In a wire fabric machine, the combination of a plurality of twister spindles, reciprocating rack-bars for rotating said spindles, a crank element, and pawls connecting said crank element with said rack-bars, substantially as described.

2. In a wire fabric machine, the combination of a plurality of twister spindles, a reciprocating rack-bar, a crank element, means for causing a substantially constant speed of travel of said crank element, and pawls connecting said crank element to said rack-bar, substantially as described.

3. In a wire fabric machine, the combination of a plurality of twister spindles, a crank element, reciprocating rack-bars, pawls connecting said crank element to said rack-bars, and automatic means for actuating said pawls, substantially as described.

4. In a wire fabric machine, the combination of a plurality of twister spindles, a rack-bar for actuating said spindles, a crank element, and a pair of opposed pawls connecting said crank element to said rack-bar, whereby motion is imparted to said rack-bars in both directions of travel of said crank element, substantially as described.

5. In a wire fabric machine, the combination of a plurality of twister spindles, rack-bars for actuating said spindles, a crank element, a pair of opposed pawls alternately connecting said rack-bars with said crank element, and automatic means for actuating said pawls, substantially as described.

6. In a wire fabric machine having a three-step movement, the combination of a plurality of twister spindles, rack-bars for actuating said spindles, a reciprocatory cross-head, a pair of opposed pawls engaging with each rack-bar and carried by said cross-head, one pair of pawls being adapted to cause a forward and backward movement of one rack-bar through half its travel, the other set of pawls being adapted to cause a forward and backward movement of the same rack-bar through the remainder of its travel, substantially as described.

7. In a wire fabric machine, the combination of a plurality of twister spindles, rack-bars for actuating said spindles, a spindle gear connecting said rack-bars, a reciprocatory cross-head, pawls connecting said cross-head to said rack-bars, and a brake element applied to said spindle gear, substantially as described.

8. In a wire fabric machine, the combination of a plurality of twister spindles, rack-bars for actuating said spindles, a reciprocatory element, means for alternately connecting said reciprocatory element to said rack-bars, stops for said rack-bars in their intermediate position, and automatic means for actuating said stops, substantially as described.

9. In a wire fabric machine, the combination of a plurality of twister spindles, a crank element for actuating said spindles, means for actuating said crank element at a substantially constant speed of travel at all points in its throw, said means including an elliptic gear and a star gear, and a pin on said elliptic gear adapted to actuate said star gear, substantially as described.

10. In a wire fabric machine, the combination of a plurality of twister spindles, a crank element for actuating said spindles, means for actuating said crank element at a substantially constant speed of travel at all points in its throw, said means including an elliptic gear and a star gear, and a pair of pins on said elliptic gear, said pins alternately actuating said star gear, substantially as described.

11. In a wire fabric machine, the combination of a plurality of twister spindles, a pair of bobbins associated with each twister spindle, slide-bars for moving said bobbins relative to said spindles, a crank element, and pawls connecting said crank element to said slide-bars, substantially as described.

12. In a wire fabric machine, the combination of a plurality of twister spindles, a pair of bobbins associated with each twister spindle, slide-bars for moving said bobbins relative to said spindles, a crank element, a pair of pawls alternately connecting said crank element to said slide-bars, and automatic means for alternately actuating said pawls, substantially as described.

13. In a wire fabric machine, the combination of a plurality of twister spindles, a pair of bobbins associated with each twister spindle, slide-bars for moving said bobbins relative to said spindles, a crank element, a pair of pawls carried by said crank element, one pawl coöperating with each slide-bar, and automatic means for actuating said pawls whereby one pawl is caused to advance a slide-bar one step, then retract and advance the bar another step, the second pawl then contacting the second slide-bar and repeating the movement of the first slide-bar, substantially as described.

14. In a wire fabric machine, the combination of a plurality of twister spindles, a pair of bobbins associated with each twister spindle, slide-bars for moving said bobbins relative to said spindles, a crank element, pawls connecting said crank element to said slide-bars, automatic means for actuating said pawls, and means for regulating said automatic means whereby said pawls are actuated once for each throw of said crank element, or once for each two throws of said crank element, substantially as described.

15. In a wire fabric machine, the combination of a plurality of twister spindles, a pair of bobbins associated with each twister spindle, slide-bars for moving said bobbins relative to said spindles, a crank element, pawls connecting said crank element to said slide-bars, and a Geneva movement for actuating said pawls, substantially as described.

16. In a wire fabric machine, the combination of a plurality of twister spindles, a pair of bobbins associated with each twister spindle, slide-bars for moving said bobbins relative to said spindles, a crank element, pawls connecting said crank element to said slide-bars, a Geneva movement for actuating said pawls, a rotary element for actuating said Geneva movement, said rotary element carrying a pin, and means for applying a second pin to said rotary element whereby the actuations of said pawls may be doubled, substantially as described.

17. In a wire fabric machine, the combination of fabric weaving mechanism, a pull-out drum, a flying shear, and straightening mechanism located outside of said shear, substantially as described.

18. In a wire fabric machine, the combination of fabric weaving mechanism, a pull-out drum, a flying shear, straightening mechanism, and means permitting the shifting of said straightening mechanism out of the line of travel of said fabric, substantially as described.

19. In a wire fabric machine, the combination of fabric weaving mechanism, a pull-out drum, a flying shear, straightening mechanism, said straightening mechanism being mounted for swinging movement whereby it is adapted to be displaced out of the line of travel of the fabric, substantially as described.

20. In a wire fabric machine, the combination of fabric weaving mechanism, a pull-out drum, a flying shear, and straightening mechanism, said mechanism including fluted rolls, substantially as described.

21. In a wire fabric machine, the combination of fabric weaving mechanism, pull-out rolls, and straightening mechanism, said straightening mechanism including fluted rolls, substantially as described.

22. In a wire fabric machine, the combination of fabric weaving mechanism, pull-out rolls, and straightening mechanism, said straightening mechanism including fluted rolls, all said rolls being interconnected and frictionally driven, substantially as described.

WILLIAM A. KILMER

Witnesses:
CHAS. F. MURRAY,
T. D. BUTLER.